United States Patent [19]

Peters

[11] Patent Number: 4,592,233
[45] Date of Patent: Jun. 3, 1986

[54] ANGULAR BASE SENSOR UTILIZING PARALLEL VIBRATING ACCELEROMETERS

[75] Inventor: Rex B. Peters, Woodinville, Wash.

[73] Assignee: Sundstrand Data Control, Inc., Redmond, Wash.

[21] Appl. No.: 737,913

[22] Filed: May 28, 1985

Related U.S. Application Data

[63] Continuation of Ser. No. 528,773, Sep. 2, 1983, abandoned.

[51] Int. Cl.$^4$ .............................................. G01P 15/08
[52] U.S. Cl. ...................................... 73/510; 73/505; 73/517 R
[58] Field of Search ..................... 73/505, 510, 517 R, 73/517 B, 516 R

[56] References Cited

U.S. PATENT DOCUMENTS

| | | | |
|---|---|---|---|
| 2,544,646 | 3/1951 | Barnaby et al. | 73/505 |
| 2,978,631 | 4/1961 | Wittke | 73/517 R |
| 3,186,237 | 6/1965 | Forrest | 73/517 R |
| 3,744,322 | 7/1973 | Pacey et al. | 73/505 |

Primary Examiner—Stewart J. Levy
Assistant Examiner—John E. Chapman, Jr.
Attorney, Agent, or Firm—Ted E. Killingsworth; Harold A. Williamson; James A. Wanner

[57] ABSTRACT

Inertial measurement of the angular rotation and translational motion of a structure can be provided by a pair of vibrating accelerometers aligned in a side-by-side arrangement with their force sensing axes in the same direction and vibrated to and away from each other along an axis normal to their force sensing axes.

11 Claims, 4 Drawing Figures

ANGULAR BASE SENSOR UTILIZING PARALLEL VIBRATING ACCELEROMETERS

RELATED PATENT APPLICATIONS

This is a continuation of co-pending application Ser. No. 528,773 filed Sept. 2, 1983, now abandoned.

This application relates to U.S. Pat. No. 4,445,376 (issued on May 1, 1984) and to co-pending U.S. patent application Ser. No. 737,919 (filed on May 28, 1985) which are directed to apparatis utilizing moving accelerometers to measure the specific force and the angular rate of a moving body.

TECHNICAL FIELD

The invention relates to the field of angular rate determination utilizing moving accelerometers and more particularly to angular rate detectors using paired accelerometers.

BACKGROUND OF THE INVENTION

In the above cited U.S. Pat. No. 4,445,376, a method and apparatus for measuring the specific force vector and angular rate vector of a moving body by means of a plurality of cyclically driven accelerometers is disclosed. The co-pending patent application Ser. No. 737,919 cited above discloses similar techniques for measuring the specific force vector and angular rate vector of a moving body utilizing either a single or a pair of accelerometers vibrating at a constant frequency. In the embodiments of the paired accelerometer rate and force sensors disclosed in the above patent application, the masses of the accelerometers are balanced with respect to rectolinear translation. This means that the pairs of accelerometers can be attached to a mounting frame work without causing any vibrational translation of the center of mass. However, the accelerometer configurations disclosed in the above patent application will produce angular vibration of any mass to which they are attached about the center of that mass.

As might be expected, it is important in many systems such as in inertial navigation systems to reduce to a minimum any vibration, be it linear or angular, that could affect the system. For example, in inertial navigation systems it is important to minimize the effects of one sensor on the performance of other sensors in the navigation system.

SUMMARY OF THE INVENTION

It is therefore an object of the invention to provide a force and angular rate sensing apparatus utilizing a pair of vibrating accelerometers configured in such a manner that torques resulting from the vibration of the accelerometers are substantially eliminated.

It is an additional object of the invention to provide an apparatus for generating a signal representing the angular rate motion of a structure that includes: first and second accelerometers; a structure for aligning the accelerometers in a side by side relationship with the force sensing axis of one accelerometer parallel to the other; a vibrating mechanism for vibrating the accelerometers individually in a substantially linear direction along a vibration axis normal to the accelerometers force sensing axis at a frequency $\omega$; and a signal processor for generating rate signals representing the angular motion of the structure about an axis perpendicular to the plane defined by the force sensing axis and the vibration axis.

It is a further object of the invention to provide an angular rate sensing accelerometer structure that includes a housing; a shaft mounted for rotation in the housing; a first accelerometer secured to a first support member; a first flexure for securing the first support member to the housing such that the first accelerometer can move in a substantially linear manner in a direction generally normal to the axis of the shaft and in a direction to and away from the shaft. The structure also includes a second support member securing a second accelerometer; a second flexure for securing the second support member to the housing such that the second accelerometer can move in a substantially linear manner in a direction generally normal to the axis of the shaft in a direction generally to and away from the shaft; a mechanism for rotationally vibrating the shaft; and a linkage arrangement connected to the shaft and the first and second support members effective to vibrate the accelerometers in the directions permitted by the flexures.

DETAILED DESCRIPTION OF THE INVENTION

Figure 1:
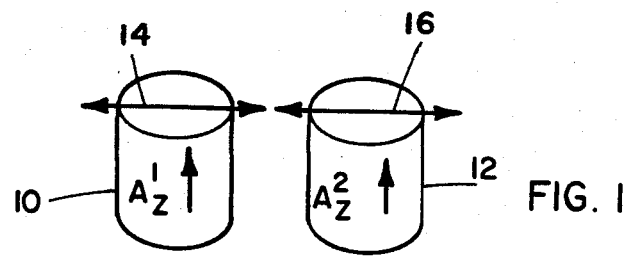
FIG. 1 is a simplified perspective diagram of a pair of accelerometers in a side by side arrangement with their force sensing axes aligned in the same direction.

As shown in FIG. 1, a pair of accelerometers 10 and 12 are mounted in a side by side arrangement with their force sensing axes $A_z^1$ and $A_z^2$ aligned in the same direction. In order to minimize any mass imbalances as well as torque imbalances that could be transmitted to a support structure (not shown), the accelerometers 10 and 12 are vibrated in opposite directions to and away from each other along the axes indicated by lines 14 and 16 which are normal to the sensitive axes $A_z^1$ and $A_z^2$. As described in detail in the co-pending Merhav patent applications, the acceleration signals from the accelerometers 10 and 12 can be used to provide signals representing translation of the structure containing the accelerometers 10 and 12 along the axes $A_z^1$ and $A_z^2$ along with signals representing angular rotation of the structure.

Figure 2:
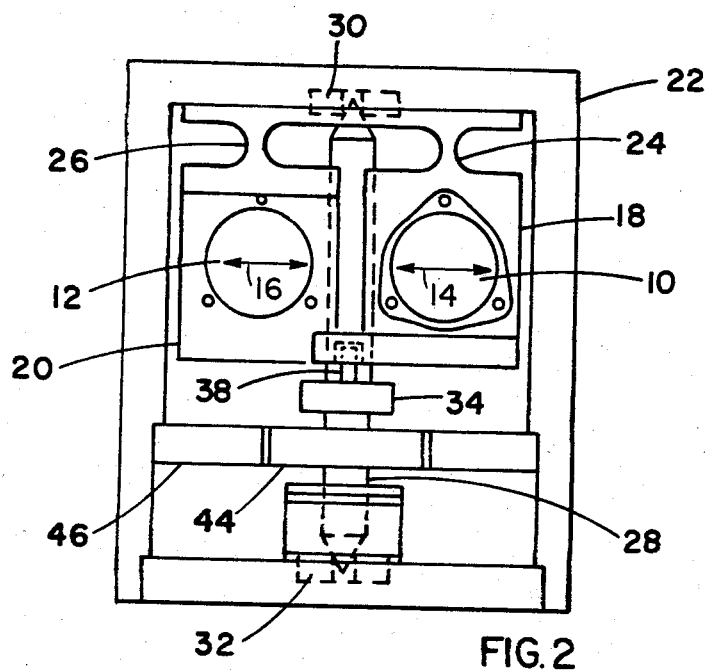
FIG. 2 is a front view of a mechanism for implementing the paired accelerometer arrangement of FIG. 1.
Figure 3:
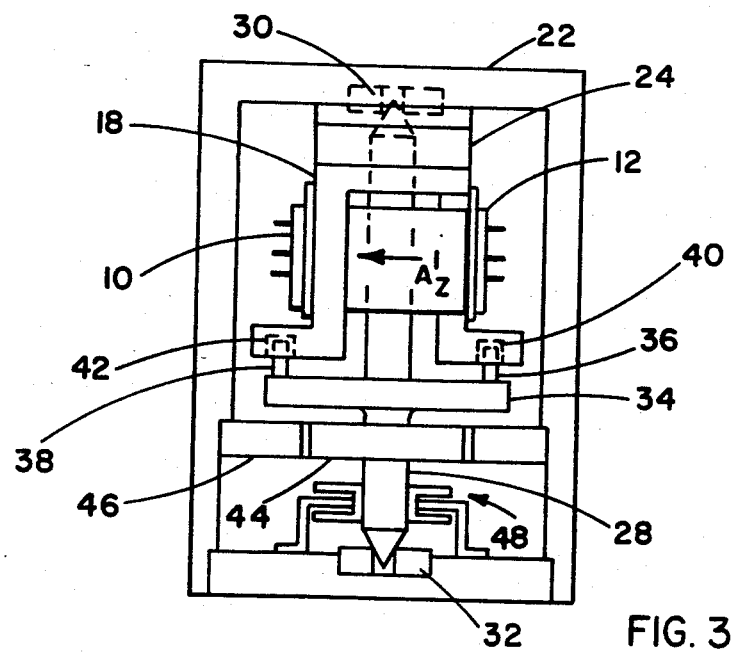
FIG. 3 is a side view of the accelerometer arrangement of FIG. 2.

The preferred embodiment of an apparatus for mechanizing the paired accelerometer structure of FIG. 1 is illustrated in FIGS. 2 and 3. In this apparatus, substantially linear translation of the accelerometers 10 and 12 along the axes 14 and 16 as shown in FIG. 1 is provided by a mechanism that includes a pair of support members 18 and 20 that hold the accelerometers 10 and 12 respectively. In turn, the support members 18 and 20 are secured to a housing 22 by means of a pair of flexures 24 and 26. A shaft 28 which is rotatably secured within the housing 22 by a pair of bearings 30 and 32, has secured to it a linkage member 34. Attached to the linkage member 34 are a pair of linkage pins 36 and 38 which are inserted into slots 40 and 42 configured into support members 18 and 20.

Also attached to the shaft 28 is a rotor 44 that, when combined with a stator 46 attached to the housing 22, will cause the shaft to vibrate back and forth through a small angle at a frequency $\omega$. As can be seen from FIGS. 2 and 3, the vibration of the shaft 28 will result in the linkage pins 36 and 38 forcing the support members 18 and 20 and hence the accelerometers 10 and 12 to move in a direction perpendicular to the shaft and toward and away from each other along the axes 14 and 16 as illustrated in FIG. 2. Movement of accelerometer 10 along axis 14 is shown in FIG. 2 and occurs in response to pin 38 urging support member 18 in a direction to or away from the shaft 28 as facilitated the flexure 24. Since the accelerometers 10 and 12 will only move a very small distance, their direction of travel will be substantially linear with respect to the axis of the shaft 28. Signals representing the rotational motion of the shaft 28 of accelerometers 10 and 12 can be obtained by means of the capacitor pick-off arrangement shown at 48. The angular capacitive detector 48 provides a means for angular motion feedback to be used in maintaining the driven motion of the shaft 28 constant over time.

Figure 4:
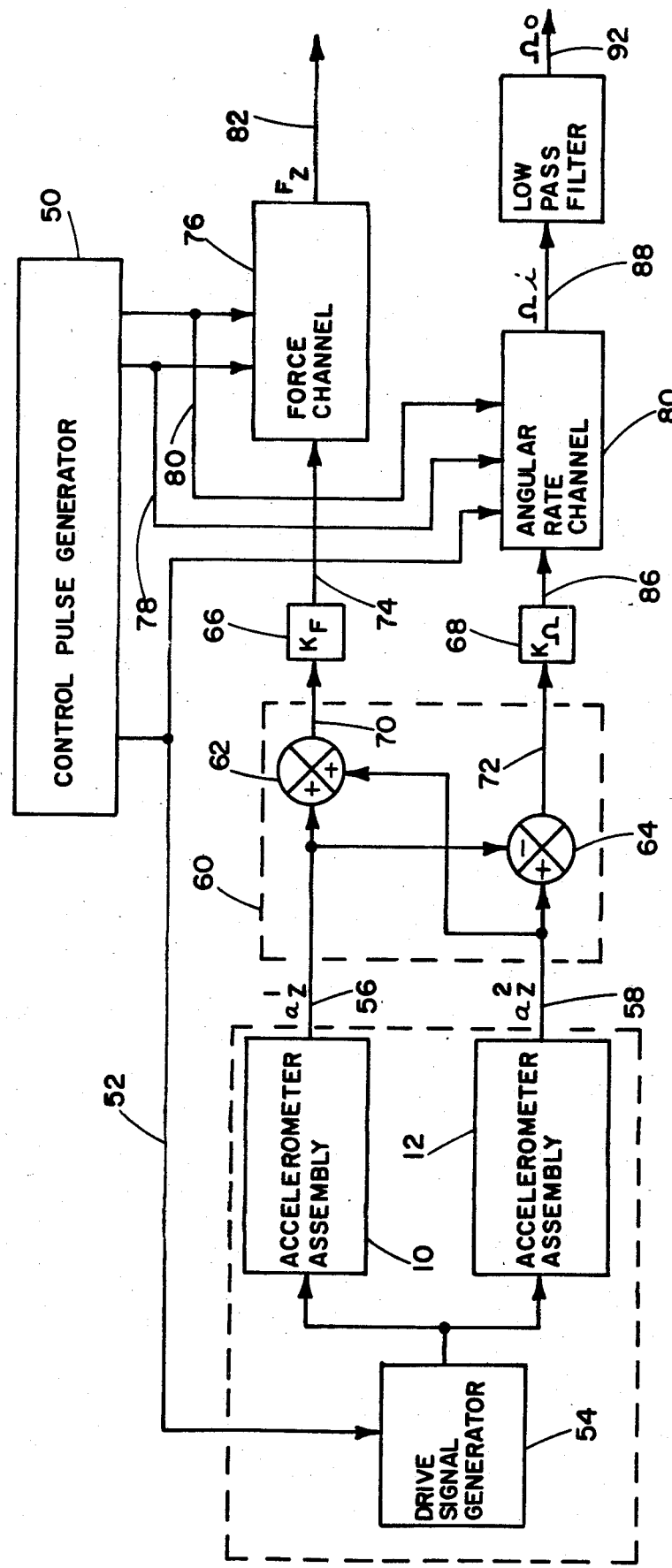
FIG. 4 is a block diagram of an analog signal separating circuit for use with a pair of accelerometers.

A signal processor for separating the force signals F from the angular rate signals $\Omega$ and the output signals of accelerometers 10 and 12 is provided in FIG. 4. A control pulse generator 50 generates signals on a line 52 as a function of the frequency $\omega$ that will cause a drive signal generator 54 to vibrate the accelerometers 10 and 12 at frequency $\omega$ as previously described. The output signals of the accelerometers 10 and 12 $a_z^1$ and $a_z^2$ are transmitted over lines 56 and 58 to a preseparation processor 60. The preseparation processor 60 shown in FIG. 4 is appropriate for a paired accelerometer mechanization of the type shown in FIG. 1 where the force sensing axes $A_z^1$ and $A_z^2$ are aligned in the same direction. The accelerometer output signals at lines 56 and 58 are summed in a summing junction 62 and differenced in a summing junction 64. A pair of scaling amplifiers 66 and 68 receive the summed and differenced signals from summing junctions 62 and 64 respectively over lines 70 and 72.

The principle of force separation is the same as the one disclosed in the previously cited Merhav Application Ser. No. 737,919 wherein the combined signal from amplifier 66 is provided over a line 74 to a force channel 76. The force channel 76 includes an integrating circuit and a sample and hold circuit with signals from the control pulse generator 50 being applied over lines 78 and 80 to the integrating and sample and hold circuits. The combined acceleration signals on lines 74 are integrated over the time period T of the frequency $\omega$ to provide a force signal $F_z$ on line 82 that represents the change in velocity along the axis Z of the structure or housing 22 holding the accelerometers 10 and 12.

Similarly, an angular rate channel processor 84 receives the differenced signals over line 86 and multiplies them by the zero mean periodic function sgnc$\omega t$. As with the force channel, the resulting signal is integrated over a time period T through a sample and hold circuit to an output line 88. The signal $\Omega_i$ representing angular rate information is transmitted through a low pass filter 90 and output on a line 92.

In the above manner signals from the accelerometer arrangement illustrated in FIGS. 1–3 may be processed to produce force signals and angular rate signals.

I claim:

1. An apparatus for generating a signal representing the angular rate motion of a structure, comprising:
   a first accelerometer, carried by the structure, for generating a first output signal representing acceleration along a first force-sensing axis;
   a second accelerometer, carried by the structure, for generating a second output signal representing acceleration along a second force-sensing axis;
   alignment means for aligning said first and second accelerometers relative to the structure in a side by side relationship with said first force-sensing axis parallel to said second force-sensing axis;
   vibration means, operatively connected to the structure and said alignment means, for vibrating said first and said second accelerometers in opposite directions toward and away from each other along collinear vibration axes which are normal to said force-sensing axes at a predetermined frequency, whereby the force and torque applied to the structure by said vibration means is balanced; and
   signal processing means, responsive to said first and second output signals, for generating a rate signal representing the angular rate motion of the structure about an axis perpendicular to the plane defined by said force-sensing axes and said vibration axis and for generating a force signal representing the acceleration of the structure along said force-sensing axes.

2. The apparatus of claim 1 wherein said first and said second force sensing axes are aligned in opposite directions.

3. The apparatus of claim 1 wherein said first and said second force sensing axes are aligned in the same direction.

4. The apparatus of claim 1 wherein said signal processing means includes preseparation processor means for combining said first and second output signals into a combined signal and angular rate channel means for converting said combined signal into said signal representing the angular rate motion of the structure.

5. The apparatus of claim 4 wherein said first and second force-sensing axes are aligned in the same direction and wherein said preseparation processor means differences said first and second output signals to form said combined signal.

6. The apparatus of claim 4 wherein said processor means includes force channel means responsive to an input signal from said preseparation processor means for generating a force signal representing the acceleration of the structure along said first and second force-sensing axes.

7. The apparatus of claim 5 wherein said processor means includes force channel means responsive to an input signal from said preseparation processor means for generating a force signal representing the acceleration of the structure along said first and second force-sensing axis and wherein said preseparation processor means includes means for summing said first and second output signals to form said input signal.

8. An angular rate sensing accelerometer structure comprising:
   a housing;
   a shaft rotatably mounted in said housing;
   a first support member;
   a first accelerometer secured to said first support member;
   a first flexure means for securing said first support member to said housing such that said first accelerometer can move in a substantially linear manner in a direction generally normal to the axis of said shaft and in a direction toward and away from said shaft;

a second support member;

a second accelerometer secured to said second support member;

a second flexure means for securing said second support member to said housing such that said second accelerometer can move in a substantially linear manner in a direction generally normal to the axis of said shaft and in a direction toward and away from said shaft;

vibrating means for rotationally vibrating said shaft; and linkage means connected to said shaft and first and second support members for vibrating said first and second accelerometers in callinear directions.

9. The structure of claim 8 wherein the force sensing axes of said first and said second accelerometers are aligned in the same direction.

10. The structure of claim 8 wherein said vibrating means includes an electric motor having a rotor secured to said shaft and a stator secured to said housing.

11. The structure of claim 8 wherein said linkage means includes first and second linkage members secured to said shaft and connected to said first and second support members respectively.

* * * * *